United States Patent
Garcia et al.

(10) Patent No.: US 12,281,731 B2
(45) Date of Patent: Apr. 22, 2025

(54) PIPE CLAMP

(71) Applicant: Garlock Hygienic Technologies, LLC, Charlotte, NC (US)

(72) Inventors: Leonel Garcia, Charlotte, NC (US); Ryan Leavy, Charlotte, NC (US); Christoph Neuffer, Charlotte, NC (US); Sascha Butter, Charlotte, NC (US)

(73) Assignee: GARLOCK HYGIENIC TECHNOLOGIES, LLC, Charlotte, NC (US)

( * ) Notice: Subject to any disclaimer, the term of this patent is extended or adjusted under 35 U.S.C. 154(b) by 0 days.

(21) Appl. No.: 18/263,065

(22) PCT Filed: Jan. 25, 2022

(86) PCT No.: PCT/US2022/013737
§ 371 (c)(1),
(2) Date: Jul. 26, 2023

(87) PCT Pub. No.: WO2022/164817
PCT Pub. Date: Aug. 4, 2022

(65) Prior Publication Data
US 2024/0229992 A1    Jul. 11, 2024

Related U.S. Application Data

(60) Provisional application No. 63/142,396, filed on Jan. 27, 2021.

(51) Int. Cl.
*F16L 23/10*    (2006.01)

(52) U.S. Cl.
CPC ................... *F16L 23/10* (2013.01)

(58) Field of Classification Search
CPC ......... F16L 23/10; F16L 17/04; F16L 21/065; F16L 21/08; F16L 2201/20; F16B 2/06
See application file for complete search history.

(56) References Cited

U.S. PATENT DOCUMENTS

| 6,708,377 B2 | 3/2004 | Maunder | |
| 7,494,157 B1 * | 2/2009 | Kiely | H02G 3/0691 439/142 |

(Continued)

FOREIGN PATENT DOCUMENTS

RU    2479781 C2    4/2013

OTHER PUBLICATIONS

PCT/US2022/013737 International Search Report and Written Opinion mailed May 5, 2022, 7 pgs. total.

*Primary Examiner* — Aaron M Dunwoody
(74) *Attorney, Agent, or Firm* — Husch Blackwell LLP (57) ABSTRACT

A clamp for is provided. The clamp has a first arm and second arm both with a pivot end and a lock end that are hingedly coupled. The lock end of the second arm has a seat and a pair of fingers forming a slot. The first arm and the second arm have a radially inwardly facing channel. A lock has a part that extends through a bore of the first arm and rotatingly engages a shoulder. The lock rotates and positions within the slot. The lock has a part that engages the other part and seats in the lock seat. A tamper collar is coupled to the locking device. A member threads through the slot and engages the tamper collar such that the locking device cannot be removed without disengaging the member.

16 Claims, 8 Drawing Sheets

(56) References Cited

U.S. PATENT DOCUMENTS

| | | | |
|---|---|---|---|
| 7,883,121 B2 * | 2/2011 | Henry | F16L 23/10 |
| | | | 285/410 |
| 8,220,113 B2 | 7/2012 | Morton et al. | |
| 9,151,420 B2 | 10/2015 | McKiernan | |
| D877,604 S | 3/2020 | Sillitoe et al. | |
| 2020/0124212 A1 * | 4/2020 | Lim | F16L 23/167 |

* cited by examiner (PRIOR ART)
FIG.1

PIPE CLAMP

CROSS-REFERENCE TO RELATED PATENT APPLICATIONS

This application claims the benefit of U.S. Provisional Patent Application No. 63/142,396, filed Jan. 27, 2021, which is incorporated by reference in its entirety.

BACKGROUND

The technology of the present application relates to connecting pipes at a flanged joints or connection and, more particularly, to a pipe clamp used to facilitate a sealingly coupling flanged joints.

Figure 1:
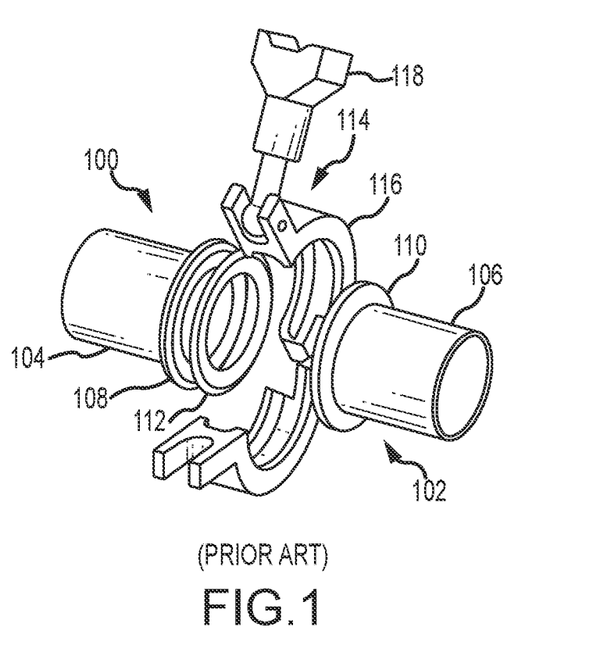
FIG. 1 is a perspective view of a conventional pipe clamp.

Fluid systems generally include many discrete sections of pipe that are joined together. Some fluid systems may couple two sections of piping together using a pipe clamp as shown in FIG. 1. Fluid system 100 includes, in this example, an upstream pipe segment 104 that terminates at a flanged surface 108. The flanged surface 108 includes a sealing groove to retain a gasket 112. Fluid system 100, in this example, includes a downstream pipe segment 106 that terminates at a flanged surface 110. The flanged surface 112 includes a sealing groove to retain the gasket 112. The flanged surfaces 108 and 110 are aligned such that the sealing grooves are aligned when pressed together.

A pipe clamp 102 has a pair of clamp arms 116 that are coupled by a hinged connection (not seen in FIG. 1 but generally known in the art). The pair of clamp arms 116 have cavities 114 that are aligned. When closed, the flanged surfaces 108 and 110 are fitted into the cavities 114 and compressed by the pipe clamp 102. The compression facilitates a fluid tight seal by compressing the gasket 112 in the aligned sealing grooves 106 and 114.

FIG. 1 shows the pipe clamp 102 in an opened position. When closed, the pair of clamp arms 116 are pivoted together until the slots, opposite the hinged connection, are generally pressed together. A locking nut 118 is coupled to one of the clamp arms using a rotating connection, such as the ball joint as shown. The locking nut 118 is pivoted about the ball joint through the slot on the other clamp arm to close the pipe clamp 102. The pipe clamp 102 is locked by tightening locking nut 118.

While functional, the pipe clamp 102 has drawbacks. For example, the pipe clamp 102 is not protected against the locking nut 118 backing off and opening. Additionally, many sanitary systems require single use clamps and the pipe clamp 102 does not have any mechanism to inhibit opening or tampering with the pipe clamp. Thus, against this background, it would be desirable to provide an improved pipe clamp.

SUMMARY

This Summary is provided to introduce a selection of concepts in a simplified form that are further described below in the Detailed Description. This Summary, and the foregoing Background, is not intended to identify key aspects or essential aspects of the claimed subject matter. Moreover, this Summary is not intended for use as an aid in determining the scope of the claimed subject matter.

In some aspects of the technology, a pipe clamp for a fluid system is provided. The pipe clamp has a first clamp arm with a pivot end and a lock end where the lock end comprising a bore and a shoulder. The pipe clamp also has a second clamp arm with a pivot end and a lock end wherein the second clamp arm is hingedly coupled to the first clamp arm such that the first clamp arm can rotate with respect to the second clamp arm. The lock end of the second clamp arm has a lock seat and a pair of fingers forming a slot. The first clamp arm and the second clamp arm have a radially inwardly facing channel. A locking device has a first part that extends through the bore of the first clamp arm and rotatingly engages the shoulder. The first part of the locking device is rotatable and selectively positionable within the slot formed by the pair of fingers. The locking device having a second part that engages the first part and seats in the lock seat. A tamper collar is coupled to the locking device, wherein the tamper collar has at least one slot. A member that threads through the at least one slot and engages the tamper collar such that the locking device cannot be removed without disengaging the member.

In certain embodiments, the pipe clamp as described above includes the lock end of the first clamp arm comprising a protrusion having a bore, and the lock end of the second clamp arm comprises a pair of tangs having a bore, wherein the bore of the protrusion aligns with the bore of the tangs and the protrusion is rotatable against the surface of the tangs, and an axle extends through the bores such that the lock end of the first clamp arm is hingedly coupled to the lock end of the second clamp arm.

The protrusion may comprise a stop to inhibit over rotation between the first clamp arm and the second clamp arm. Additionally, the second clamp arm comprises a bump surface to engage the stop.

In certain aspects, the pipe clamp as described above, the member may comprise a zip tie engagable with a slot on the tamper collar and another portion of the pipe clamp or fluid system to inhibit unlocking of the pipe clamp.

In certain aspects, the pipe clamp as described above, the first part of the locking device comprises a screw having a head and a threaded shaft, wherein the head is shaped to cooperatively engage the shoulder and wherein the second part of the locking device comprises a nut having a base with a threaded bore to receive the threaded shaft and a plurality of flared extensions to tighten the nut on the screw.

In certain aspects, the pipe clamp as described above, the base of the nut comprises a seating tip shaped to cooperatively engage the lock seat. The seating tip comprises at least one of a protrusion and a divot and the lock seat comprises a corresponding at least one of a divot and protrusion such that the at least ones of the protrusions and divots engage to inhibit reverse threading of the nut. In certain aspects, instead of a protrusion that engages a divot or detent, the lock seat and seating tip may both comprise protrusions, such as offset squares that engage in a saw tooth arrangement to inhibit reverse threading. The protrusions may be chamfered.

In certain aspects, the first clamp arm and the second clamp arm are formed from a polymer. The polymer may in certain embodiments be a polyamides, such as, for example, nylon. In an embodiment of the invention, the components of the assembly are made of plastics, such as, for example, thermoplastics. Material, and suitable plastics include polycarbonate, polyamides, polyoxymethylene (POM) and polysulphone. Generally, the plastic should be chosen so as to confer sufficient strength to the clamp, including operational strength under hoop stress, as this stress is present in use of the clamp around a pipe such that the plastic does not deform, or at most elastically deforms. The plastic should resistant to water. The plastic should have good tensile strength. Generally, the plastic is an engineering polymer rather than a commodity plastic. The plastic may be moldable. In certain instances, the plastic may be filled, such as with fibers or particles, such as, for example, glass fibers, to add rigidity and/or other desirable characteristics. A fill level of from about zero to 50 percent is suitable with a fill range more typically between about 30 to 40 percent.

The pipe clamp as described above may have an outer surface of the first clamp arm and an outer surface of the second clamp arm formed with a radius. The radius provides a runoff for water or other liquids.

In some aspects, the axle comprises a female part comprising a hollow shaft and a first flanged end and a male part comprising a protrusion shaped to fit in the hollow shaft and a second flanged end wherein the first flanged end and the second flanged end engage an outer surface of the opposed pair of tangs.

The pipe clamp as described above may be used in a fluid system. The fluid system includes an upstream pipe segment terminating in a flanged surface; a downstream pipe segment terminating in a flanged surface; and a gasket positioned between the flanged surfaces of the upstream and downstream pipe segment. The fluid system may comprise the upstream pipe segment having a gasket groove and the flanged surface of the downstream pipe segment having a gasket groove where the gasket grooves are aligned and receive a bulbous portion of the gasket.

These and other aspects of the present system and method will be apparent after consideration of the Detailed Description and Figures herein.

DRAWINGS

Non-limiting and non-exhaustive embodiments of the present invention, including the preferred embodiment, are described with reference to the following figures, wherein like reference numerals refer to like parts throughout the various views unless otherwise specified.

DETAILED DESCRIPTION

The technology of the present application will now be described more fully below with reference to the accompanying figures, which form a part hereof and show, by way of illustration, specific exemplary embodiments. These embodiments are disclosed in sufficient detail to enable those skilled in the art to practice the technology of the present application. However, embodiments may be implemented in many different forms and should not be construed as being limited to the embodiments set forth herein. The following detailed description is, therefore, not to be taken in a limiting sense.

The technology of the present application is described with specific reference to a pipe clamp for a sanitary fluid system because sanitary fluid systems are moving to single use clamp. However, the technology described herein may be used with applications other than those specifically described herein. For example, the technology of the present application may be applicable to any fluid system, whether liquid or gas, for joining pipe segments or the like. Moreover, the technology of the present application will be described with relation to exemplary embodiments. The word "exemplary" is used herein to mean "serving as an example, instance, or illustration." Any embodiment described herein as "exemplary" is not necessarily to be construed as preferred or advantageous over other embodiments. Additionally, unless specifically identified otherwise, all embodiments described herein should be considered exemplary.

Figure 2:
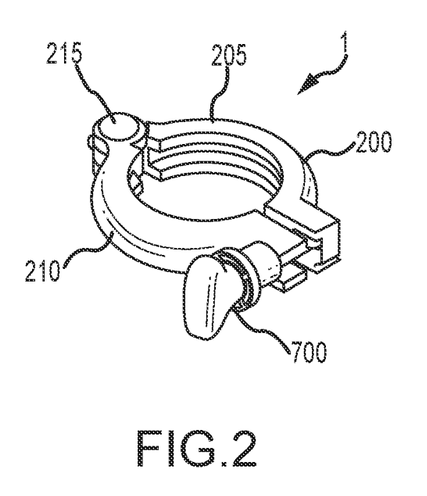
FIG. 2 is a perspective view of a pipe clamp consistent with the technology of the present application in a closed position.
Figure 3:
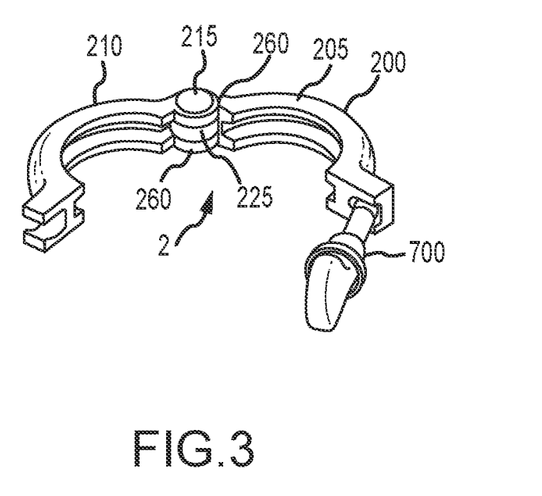
FIG. 3 is a perspective view of a pipe clamp consistent with the technology of the present application in an open position.

With reference now to FIGS. 2 and 3, a pipe clamp 200 consistent with the technology of the present application is shown in a perspective view. The pipe clamp 200 is shown in a closed position 1 in FIG. 2 and an open position 2 in FIG. 3. The pipe clamp may be made from metals, polymers, combinations thereof, or the like.

The pipe clamp 200 includes a first clamp arm 205 and a second clamp arm 210, both of which may be formed form metals or polymers, such as, for example, polycarbonate, polyamides (such as nylon), polyoxymethylene (POM) and polysulphone to name but a few polymers. The first clamp arm 205 and the second clamp arm 210 are hingedly coupled by a hinge 215. The first clamp arm 205 is described in FIGS. 4 and 4a below. The second clamp arm 210 is described in FIGS. 5 and 5a below. In the closed position 1, a locking device 700 locks the first clamp arm 205 and the second clamp arm 210 in the closed position.

Figure 4:
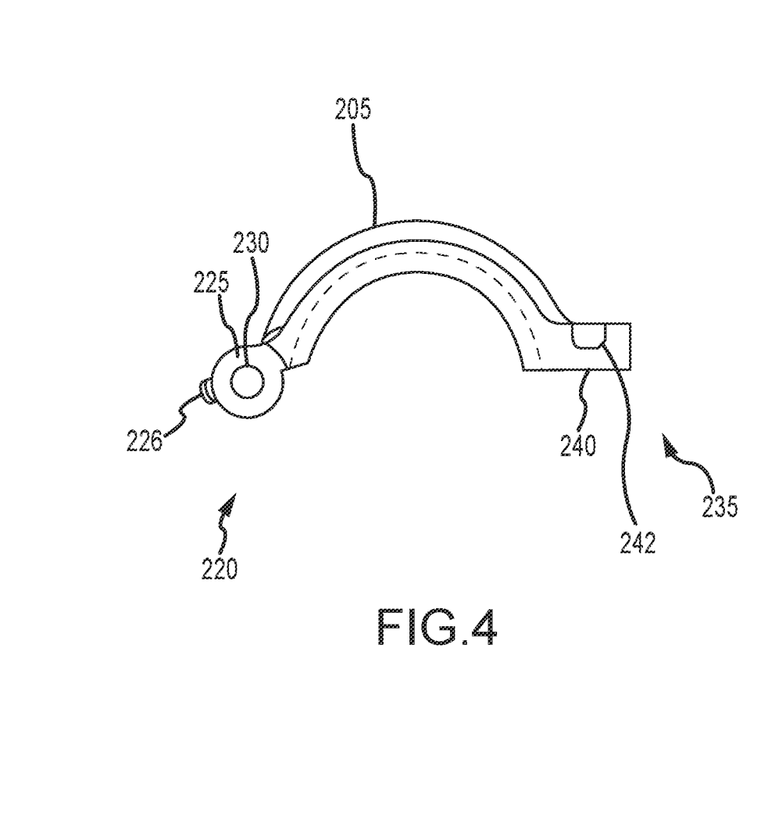
FIGS. 4 and 4a are views of a first clamp arm of the pipe clamps shown in FIGS. 2 and 3.
Figure 4A:
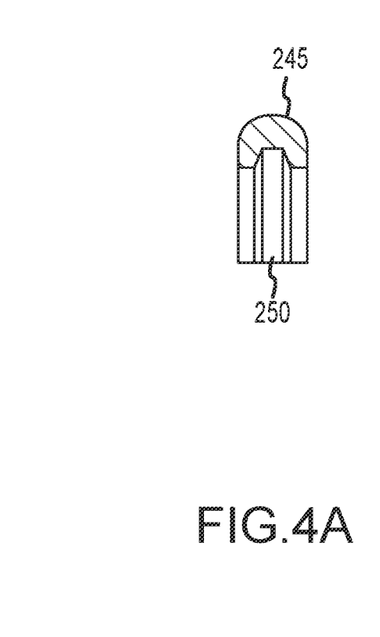

FIG. 4 shows a side view of the first clamp arm 205. The dimensions shown on the figure are exemplary for a prototypical clamp arm 205, but should not be considered limiting. The clamp arm 205 has a pivot end 220 that terminates in a protrusion 225 having a bore 230, which forms part of the hinge 215. A stop 226 extends from the protrusion 225. The stop 226 inhibits over rotation between the first clamp arm 205 and the second clamp arm 210. The clamp arm 205 has a lock end 235, which is opposite the pivot end 220. The lock end 235 has a bore 240. One end of the bore 240 has a shoulder 242, which will be explained further below. FIG. 4a shows a cross sectional view of the first clamp arm 205. The first clamp arm 205, which has an arched shape, has a convex outer surface 245, and a radially inwardly opened channel 250. The convex outer surface 245 (or radiused outer surface 245) provides a runoff for water, or other liquids, to inhibit pooling or corrosion due to the water, or other liquid.

Figure 5:
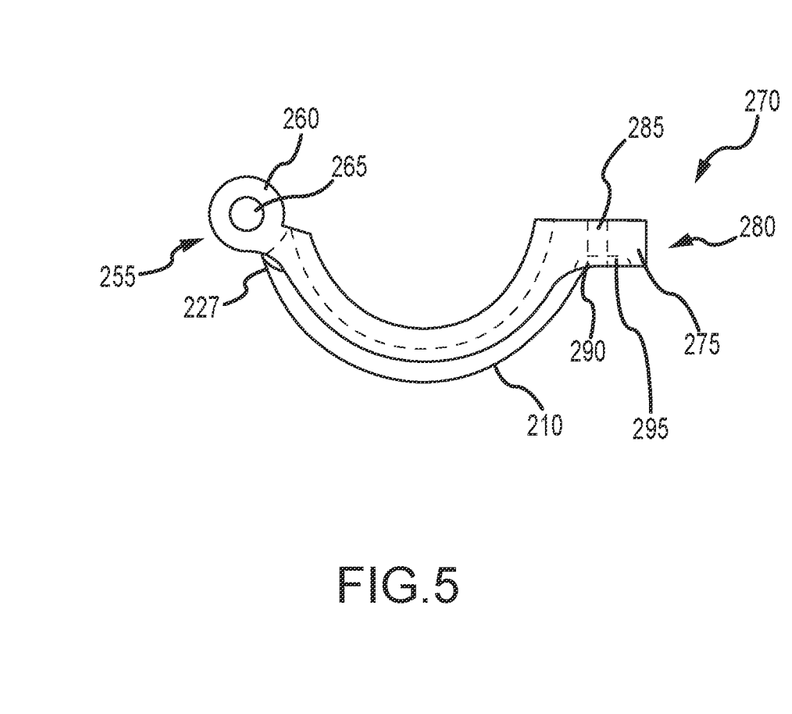
FIGS. 5 and 5a are views of a second clamp arm of the pipe clamps shown in FIGS. 2 and 3.
Figure 5A:
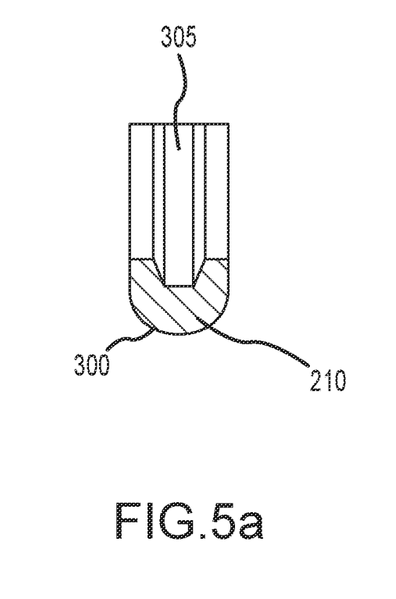

FIG. 5 shows a side view of the second clamp arm 210. The dimensions shown on the figure are exemplary for a prototypical clamp arm 210, but should not be considered limiting. The clamp arm 210 has a pivot end 255 that terminates in a pair of tangs 260, each of which having a bore 265, which forms part of the hinge 215. As shown best in FIG. 3, the pair of tangs 260 are arranged on opposite sides of the protrusion 225 such that the bores 230 and 265 align to receive an axle. The stop 226 on the protrusion 225 engages a bump surface 227 between the tangs 260. The stop 226, together with the bump surface 227, inhibits the over rotation. The clamp arm 210 has a lock end 270, which is opposite the pivot end 255. The lock end 270 has a pair of fingers 275 extending from the lock end 270 to form a slot 280. The pair of fingers 275 have a bore 285 and a lock seat 290, which may have lock divots 295 (which will be explained further below). The lock divots 295 may be lock protrusions 295 as will be explained further below instead of divots. FIG. 5a shows a cross sectional view of the second clamp arm 210. The second clamp arm 210, which has an arched shape that matches the arched shape of the first clamp arm 205, has a convex outer surface 300, and a radially inwardly opened channel 305, which aligns with the channel 250. The convex outer surface 300 (or radiused outer surface 300) provides a runoff for water, or other liquids, to inhibit pooling or corrosion due to the water, or other liquid The protrusion 225 on the first clamp arm 205 and the tangs 260 on the second clamp arm 210 may be switched. Although not shown, the protrusion 225 on the second clamp arm 210 and the tangs 260 on the first clamp arm 205 would function as explained herein.

Figure 6:
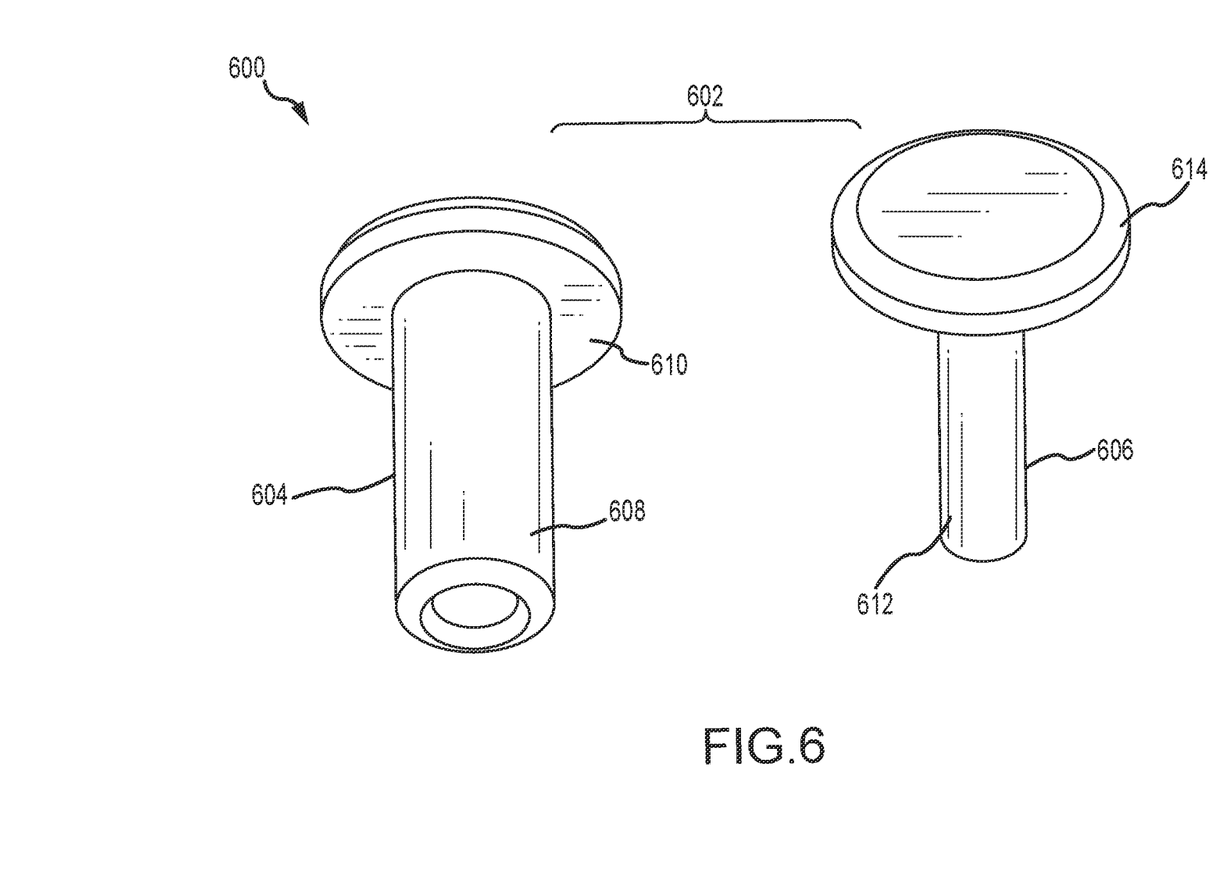
FIG. 6 is a perspective view of an axle consistent with the technology of the present application for the pipe clamp of FIGS. 2 and 3.

With reference to FIG. 6, an exemplary axle 600 that fits in the aligned bores 230 and 265 as explained above. The axle 600, in this exemplary embodiment, includes a press fit connector 602 having a female portion 604 and a male portion 606. The female portion 604 includes a hollow axle shaft 608 and a flanged end 610. The male portion 606 includes a protrusion 612 sized to fit snuggly in the hollow axle shaft 608 and a flanged end 614. The flanged ends 610 and 614 have surfaces that rotate against the tangs 260. The press fit axle 600 described herein is one exemplary means of providing an axle, and other axles as are known in the art are possible.

Figure 7:
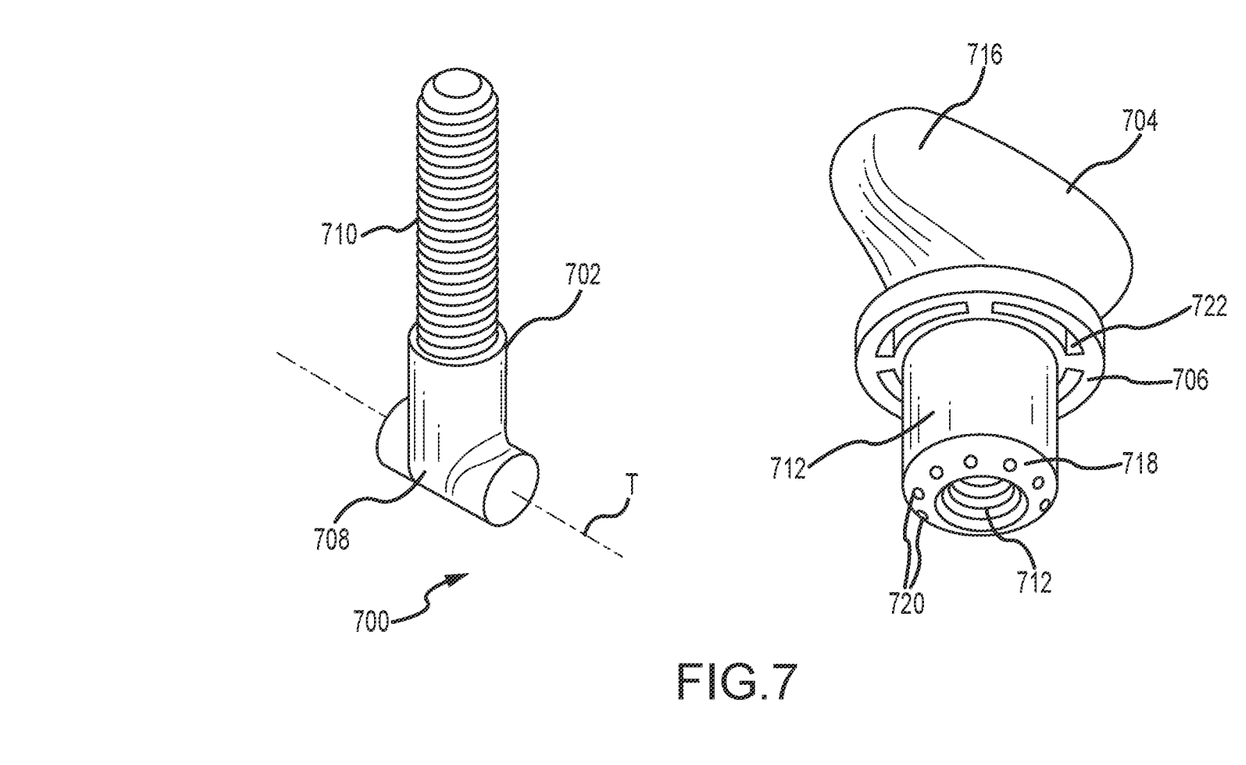
FIG. 7 is a perspective view of a locking device consistent with the technology of the present application for the pipe clamp of FIGS. 2 and 3.

FIG. 7 shows the locking device 700. The locking device 700, in this exemplary embodiment, comprises a first part 702, which is a screw 702 in this example, and a second part 704, which is a nut 704 in this example. More specifically, the nut 704 in this case is a wing nut 704 with a tamper collar 706. The screw 702 has a head 708, which is a T-head in this exemplary embodiment, and a threaded shaft 710. The nut 704 has a threaded bore 712 in a base 714 to receive the threaded shaft 710. The base 714 of the nut 704 has a pair of flared extension 716, which may be referred to as grips, that extend from the base 714 to allow for tightening the nut 704 on the screw 702. The base 714 has a convex seating tip 718 that may include protrusions 720 (the protrusions 720 may be replaced with detents 720). The protrusion 720 engage the lock divots 295 when the seating tip 718 engages the lock seat 290 formed by the fingers 275 (see FIGS. 5 and 5a). As mentioned above, the protrusion 720 may be detents 720 in which case the lock divots 295 may be lock protrusions 295.

Figure 8:
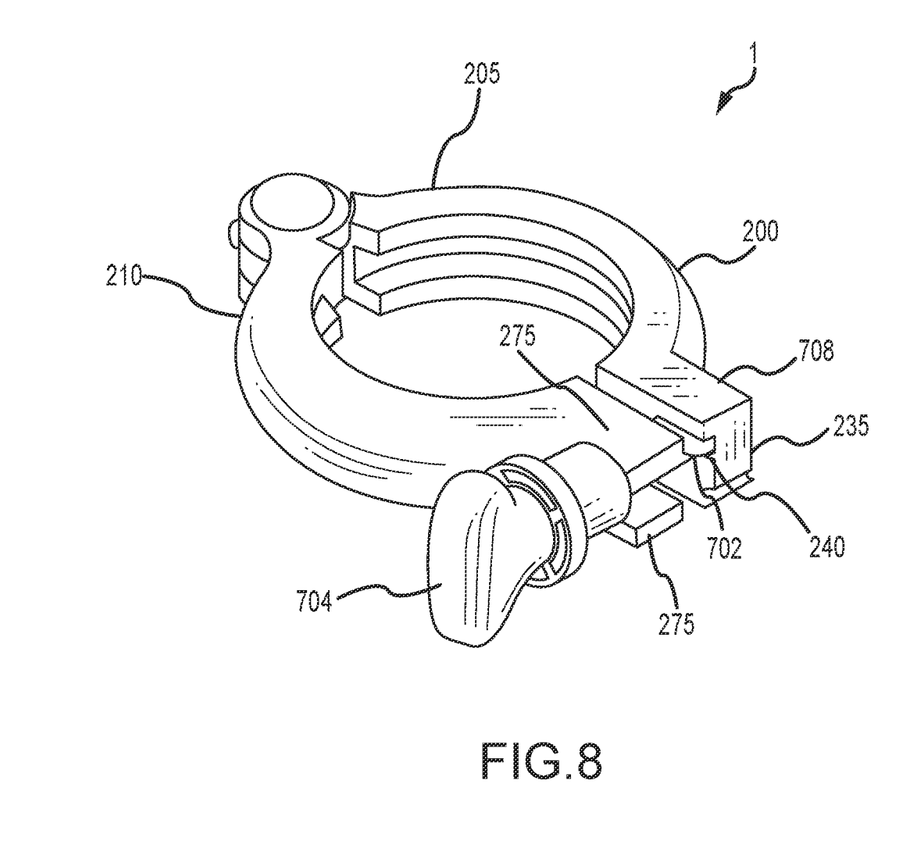
FIG. 8 is another view of the pipe clamp in the closed position consistent with the pipe clamp of FIG. 2.

With reference to FIG. 8, which shows the pipe clamp 200 in the closed position 1, the screw 702 is positioned bore 240 on the lock end 235 of the first clamp arm 205. The head 708 of the screw 708 has a width wider than the diameter of the bore 240 such that the head 708 rests against a shoulder 242 (see FIG. 4) on the lock end 235. The shoulder 242 on the lock end may be shaped to mate with the head 708. Regardless of whether the shoulder is shaped to mate with the head 708, the screw can rotate about an axis defined by the head 708, such that the transverse axis T shown in FIG. 7. When the first clamp arm 205 and the second clamp arm 210 are rotated into the closed position 2, screw 702 is rotated about the axis T such that it extends from the bore 240 through the lock seat 290 formed by the fingers 275. The nut 704 is tightened onto the screw 702 until the seating tip seats in the lock seat and the protrusions/detents engage the divots/protrusions, which inhibits the nut 704 from reverse threading.

Figure 10:
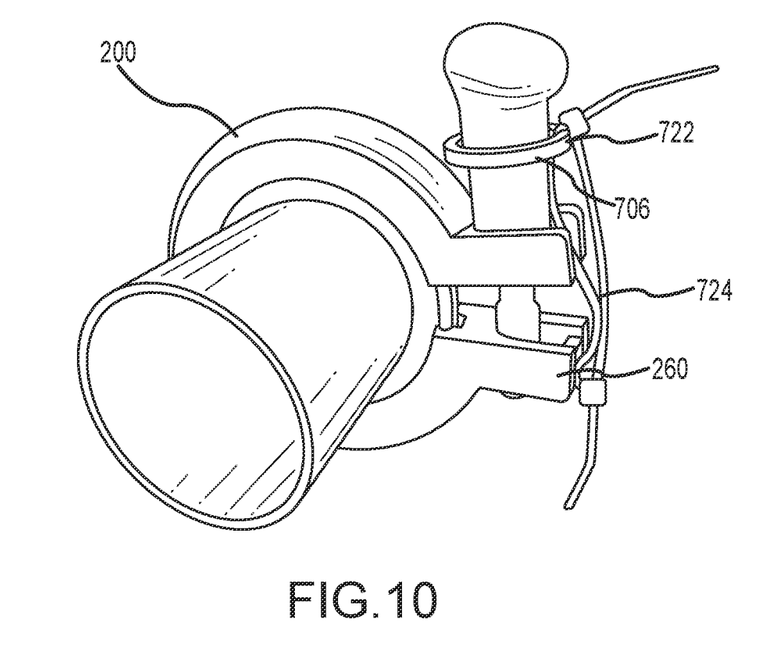
FIG. 10 is a view of an installed pipe clamp consistent with the technology of the present application.

With reference back to FIG. 7, the tamper collar 706 extends around all or a portion of the base 712 of the nut 704. The tamper collar 706 has a plurality of slots 722 to receive a member (not specifically shown in FIG. 7). The member may be, for example, a zip tie or other securable device that will provide indicia of tampering or unlocking. FIG. 10 shows a perspective view of the pipe clamp 200 with member 724 threaded through one of the slots 722 on the tamper collar 706 and around a portion of one tang 260 or both tangs 260. Generally, one of the tangs 260 or a cross member between the tangs will have a through cavity that allows the member 724 to wrap around a portion of the pipe clamp 200. While the member 724 is shown wrapping around a portion of the tangs 260 or a cross member between the tangs 260, the member 724 may wrap around almost any other portion or feature of the pipe clamp 200. Other means for providing indicia of tampering may include, among other things, a color, a breakaway tab, or the like. The member is inserted through at least one of the slots 722 and wrapped around a portion of the pipe clamp 200. For example, a zip tie may be threaded through a slot 722 and wrapped around the upstream or downstream pipe segment 104/106. The member may be secured to other portions of the fluid system and/or pipe clamp as well. If the locking device 700 is unlocked, the nut 704 needs to be turned, which necessarily would break the zip tie threaded through the slot.

Figure 9:
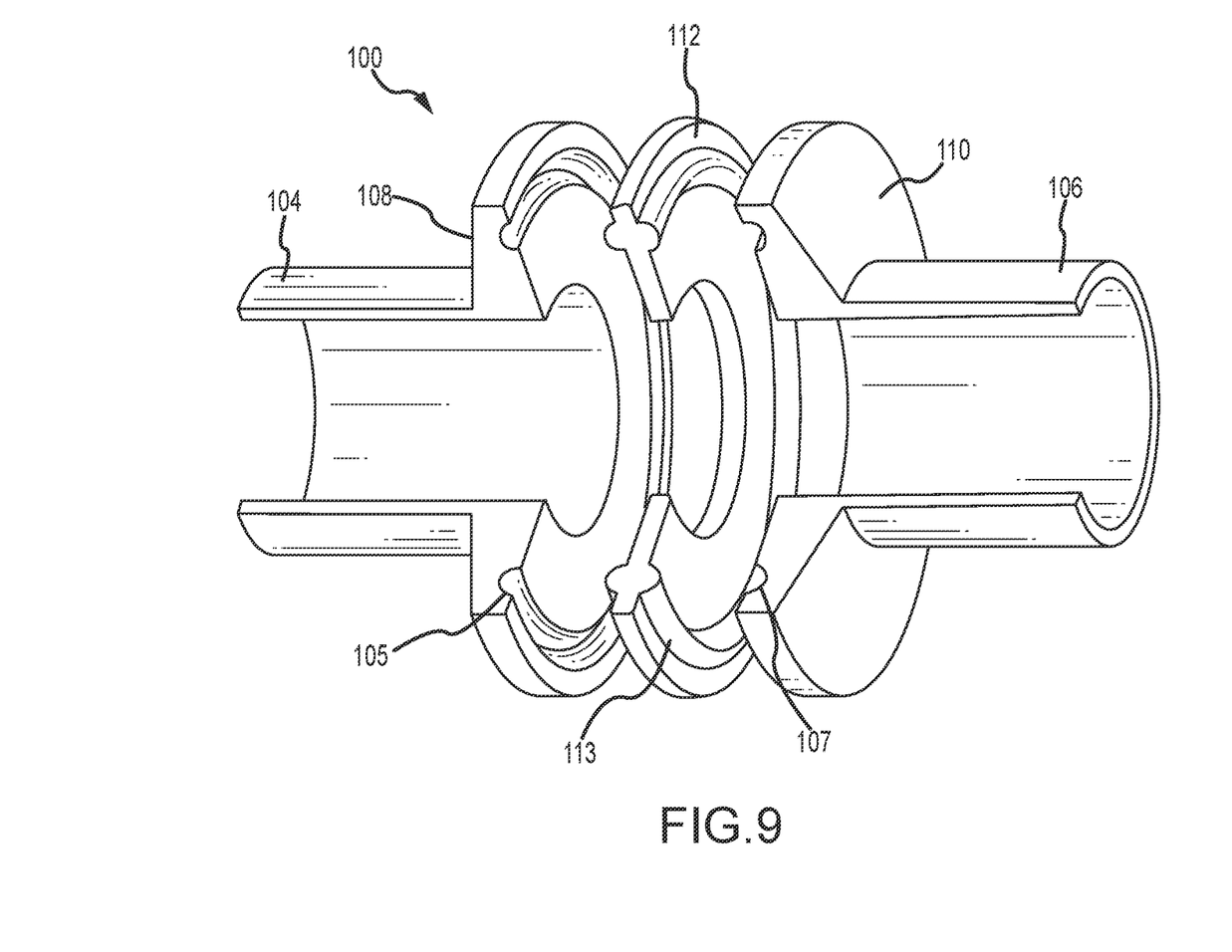
FIG. 9 is an exploded view of an exemplary fluid system consistent with the technology of the present application with the pipe clamp removed for clarity.

For reference, FIG. 9 shows a cut away view of a fluid system 100 without a pipe clamp attached. As can be appreciated, fluid system 100 includes an upstream pipe segment 104 and a downstream pipe segment 106. The upstream pipe 104 segment terminates in a flanged surface 108 and the downstream pipe segment 106 terminates in a flanged surface 110. The upstream pipe segment 104 has a groove 105 in the flanged surface 108 and the downstream pipe segment 106 has a groove 107 in the flanged surface 110. Each of the grooves 105/107 receives a portion of the gasket 112, such as the bulbous portion 113 of gasket 112.

The flanged surfaces 108 and 110 when engaged by the pipe clamp 200 are compressed. The compression of the flanged surfaces 108 and 110 provides compression to the gasket 112, and the bulbous portion 113, such that the gasket provides a fluid tight seal between the flanged surface 108 and 110.

Although the technology has been described in language that is specific to certain structures and materials, it is to be understood that the invention defined in the appended claims is not necessarily limited to the specific structures and materials described. Rather, the specific aspects are described as forms of implementing the claimed invention. Because many embodiments of the invention can be practiced without departing from the spirit and scope of the invention, the invention resides in the claims hereinafter appended. Unless otherwise indicated, all numbers or expressions, such as those expressing dimensions, physical characteristics, etc. used in the specification (other than the claims) are understood as modified in all instances by the term "approximately." At the very least, and not as an attempt to limit the application of the doctrine of equivalents to the claims, each numerical parameter recited in the specification or claims which is modified by the term "approximately" should at least be construed in light of the number of recited significant digits and by applying ordinary rounding techniques. Moreover, all ranges disclosed herein are to be understood to encompass and provide support for claims that recite any and all subranges or any and all individual values subsumed therein. For example, a stated range of 1 to 10 should be considered to include and provide support for claims that recite any and all subranges or individual values that are between and/or inclusive of the minimum value of 1 and the maximum value of 10; that is, all subranges beginning with a minimum value of 1 or more and ending with a maximum value of 10 or less (e.g., 5.5 to 10, 2.34 to 3.56, and so forth) or any values from 1 to 10 (e.g., 3, 5.8, 9.9994, and so forth).

What is claimed is:

1. A pipe clamp for a fluid system comprising,
a first clamp arm having a pivot end and a lock end, the pivot end of the first clamp arm comprising a protrusion having a bore where a stop on the protrusion inhibits over rotation of the first clamp arm, the lock end comprising a bore and a shoulder, the first clamp arm having a radially inwardly facing channel;
a second clamp arm having a pivot end and a lock end, the pivot end of the second clamp arm having a pair of tangs having a bore such that the bore of the first clamp arm aligns with the bore of the second clamp arm, the lock end comprising a lock seat and a pair of fingers forming a slot, the second clamp arm having a radially inwardly facing channel;
an axle extending between the bore of the first clamp arm and the bore of the second clamp arm wherein the second clamp arm is hingedly coupled to the first clamp arm such that the first clamp arm can rotate with respect to the second clamp arm;
a locking device, the locking device having a first part that extends through the bore of the first clamp arm and rotatingly engages the shoulder, the first part is rotatable to be positionable within the slot formed by the pair of fingers, the locking device having a second part that engages the first part and seats in the lock seat;
a tamper collar coupled to the locking device, wherein the tamper collar comprises at least one slot; and
a member that threads through the at least one slot and engages the tamper collar such that the locking device cannot be removed without disengaging the member.

2. The pipe clamp of claim 1 wherein the second clamp arm comprises a bump surface to engage the stop.

3. The pipe clamp of claim 1 wherein the first part of the locking device comprises a screw having a head and a threaded shaft, wherein the head is shaped to cooperatively engage the shoulder and wherein the second part of the locking device comprises a nut having a base with a threaded bore to receive the threaded shaft and a plurality of flared extensions to tighten the nut on the screw.

4. The pipe clamp of claim 3 wherein the base of the nut comprises a seating tip shaped to cooperatively engage the lock seat.

5. The pipe clamp of claim 4 wherein the seating tip comprises at least one of a protrusion and a divot and the lock seat comprises a corresponding at least one of a divot and protrusion such that the at least ones of the protrusions and divots engage to inhibit reverse threading of the nut.

6. The pipe clamp of claim 1 wherein the first clamp arm and the second clamp arm are formed from a polymer.

7. The pipe clamp of claim 6 wherein the polymer is nylon.

8. The pipe clamp of claim 1 wherein an outer surface of the first clamp arm and an outer surface of the second clamp arm have a radius.

9. The pipe clamp of claim 1 wherein the axle comprises a female part comprising a hollow shaft and a first flanged end and a male part comprising a protrusion shaped to fit in the hollow shaft and a second flanged end wherein the first flanged end and the second flanged end engage an outer surface of the opposed pair of tangs.

10. A pipe clamp for a fluid system comprising:
a first clamp arm having a pivot end and a lock end, the lock end comprising a bore and a shoulder, the first clamp arm having a radially inwardly facing channel;
a second clamp arm having a pivot end and a lock end wherein the second clamp arm is hingedly coupled to the first clamp arm such that the first clamp arm can rotate with respect to the second clamp arm, the lock end comprising a lock seat and a pair of fingers forming a slot, the second clamp arm having a radially inwardly facing channel;
a locking device, the locking device having a first part that extends through the bore of the first clamp arm and rotatingly engages the shoulder, the first part is rotatable to be positionable within the slot formed by the pair of fingers, the locking device having a second part that engages the first part and seats in the lock seat;
a tamper collar coupled to the locking device, wherein the tamper collar comprises at least one slot; and
a zip tie that threads through the at least one slot and engages the tamper collar such that the locking device cannot be removed without disengaging the member.

11. A fluid system, the fluid system comprising:
an upstream pipe segment terminating in a flanged surface;
a downstream pipe segment terminating in a flanged surface;
a gasket positioned between the flanged surfaces of the upstream and downstream pipe segment;
a pipe clamp comprising:
a first clamp arm having a pivot end and a lock end, the lock end comprising a bore and a shoulder, the first clamp arm having a radially inwardly facing channel;
a second clamp arm having a pivot end and a lock end wherein the second clamp arm is hingedly coupled to the first clamp arm such that the first clamp arm can rotate with respect to the second clamp arm, the lock end comprising a lock seat and a pair of fingers forming a slot, the second clamp arm having a radially inwardly facing channel;
a locking device, the locking device having a first part that extends through the bore of the first clamp arm and rotatingly engages the shoulder, the first part is rotatable to be positionable within the slot formed by the pair of fingers, the locking device having a second part that engages the first part and seats in the lock seat;
a tamper collar coupled to the locking device; and
a member that engages the tamper collar when the first clamp arm is locked to the second clamp arm such that the locking device cannot be removed without disengaging the member, wherein
the flanged surface of the upstream pipe segment and the flanged surface of the downstream pipe segment are sized to fit within the radially inwardly facing channel of the first clamp arm and the radially inwardly facing channel of the second clamp arm, such that the pipe clamp compresses the flanged surfaces together to form a fluid tight seal with the gasket.

12. The fluid system of claim 11 wherein the flanged surface of the upstream pipe segment comprises a gasket groove and the flanged surface of the downstream pipe segment comprises a gasket groove where the gasket grooves are aligned and receive a bulbous portion of the gasket.

13. A pipe clamp for a fluid system comprising,
- a first clamp arm having a pivot end and a lock end, the lock end comprising a bore and a shoulder, the first clamp arm having a radially inwardly facing channel;
- a second clamp arm having a pivot end and a lock end wherein the second clamp arm is hingedly coupled to the first clamp arm such that the first clamp arm can rotate with respect to the second clamp arm, the lock end comprising a lock seat and a pair of fingers forming a slot, the second clamp arm having a radially inwardly facing channel, wherein the lock seat comprises at least one of a plurality of lock divots or a plurality of lock protrusions;
- a locking device, the locking device having a first part that extends through the bore of the first clamp arm and rotatingly engages the shoulder, the first part is rotatable to be positionable within the slot formed by the pair of fingers, the locking device having a second part comprises a seating tip have at least one of a plurality of protrusions or a plurality of detents that correspond and are sized to engage the at least one of the plurality of lock divots or the plurality of lock protrusions in the lock seat such that the engagement inhibits reverse threading of the second part;
- a tamper collar coupled to the locking device; and
- a member that engages the tamper collar such that the locking device cannot be removed without disengaging the member.

14. The pipe clamp of claim 13 wherein the first clamp arm comprises a convex outer surface and the second clamp art comprises a convex outer surface.

15. The pipe clamp of claim 13 wherein the tamper collar comprises at least one slot and the member engages the tamper collar by threading through the at least one slot.

16. The pipe clamp of claim 13 wherein the first part of the locking device comprises a head and a threaded shaft and the second part of the locking device comprises a nut and a threaded bore.

* * * * *